United States Patent
Sherman (10) Patent No.: US 7,962,183 B2
(45) Date of Patent: Jun. 14, 2011

(54) APPARATUS FOR AND METHOD OF MANAGING PEAK CURRENT CONSUMPTION OF MULTIPLE SUBSYSTEMS IN A MOBILE HANDSET

(75) Inventor: Itay Sherman, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 760 days.

(21) Appl. No.: 11/617,695

(22) Filed: Dec. 28, 2006

(65) Prior Publication Data

US 2008/0161071 A1 Jul. 3, 2008

(51) Int. Cl.
*H04M 1/00* (2006.01)

(52) U.S. Cl. ............... 455/574; 455/572; 455/343.1; 455/343.2; 455/343.4; 370/318; 345/102; 345/211

(58) Field of Classification Search .......... 455/572–574, 455/266; 323/222; 345/102, 211
See application file for complete search history.

(56) References Cited

U.S. PATENT DOCUMENTS

| 2005/0151518 A1* | 7/2005 | Schneiker et al. | 323/222 |
| 2005/0221871 A1* | 10/2005 | Kim | 455/574 |
| 2008/0026718 A1* | 1/2008 | Wangard et al. | 455/266 |

* cited by examiner

*Primary Examiner* — Kent Chang
*Assistant Examiner* — Kathy Wang-Hurst
(74) *Attorney, Agent, or Firm* — Ronald O. Neerings; Wade James Brady, III; Frederick J. Telecky, Jr.

(57) ABSTRACT

A novel and useful mechanism for regulating and managing the peak current consumption of the subsystems in a mobile handset device. The mechanism of the present invention is operative to limit the current consumption at any point in time to a predetermined level that is within the current handling capability of the power management system of the handheld device. The mechanism operates by having the high peak current subsystems advertise in advance their intention to initiate a current peak. An arbitration mechanism considers the advertisements or requests sent from interested subsystems and determines whether a subsystem is either granted permission to initiate or is blocked from initiating a peak current session.

16 Claims, 6 Drawing Sheets

APPARATUS FOR AND METHOD OF MANAGING PEAK CURRENT CONSUMPTION OF MULTIPLE SUBSYSTEMS IN A MOBILE HANDSET

FIELD OF THE INVENTION

The present invention relates to the field of data communications and more particularly relates to an apparatus for and method of managing peak current consumption of multiple subsystems in a mobile handset.

BACKGROUND OF THE INVENTION

Mobile handsets are in widespread use around the world today. One of the most common type of mobile handset is use today is the cellular telephone. Unlike handsets in the past, modern advanced handsets such as the latest cellular telephones incorporate multiple subsystems. In addition to the main cellular radio, handsets nowadays incorporate any number of additional subsystems. Examples include GPS receivers, FM radios, Bluetooth radios, Wireless Local Area Network (WLAN) modems, WiMax modems, Ultra Wideband (UWB) modems, telephone receivers, etc.

Figure 1:
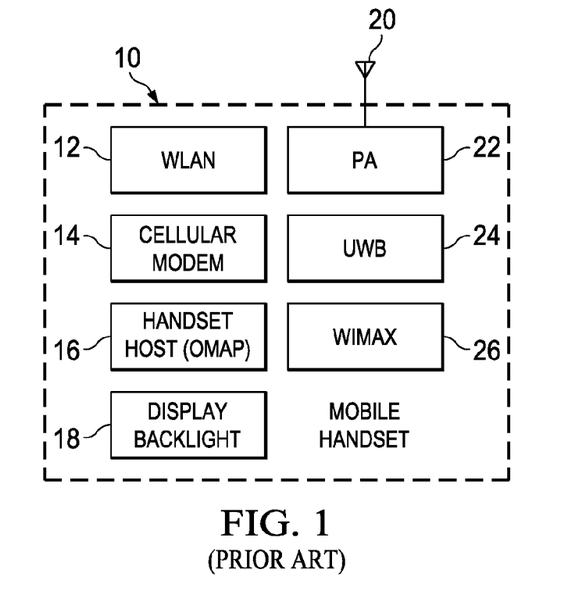
FIG. 1 is a simplified block diagram illustrating several major blocks of an example prior art mobile handset device.

A simplified block diagram illustrating several major blocks of an example prior art mobile handset device is shown in FIG. 1. The mobile handset, generally referenced 10, comprises several technology blocks including a WLAN block 12, cellular modem block 14, handset host (OMAP) block 16, UWB block 24, WiMax block 26 and the TX power amplifier block 22, display backlight 18 and antenna 22.

Each of these subsystems, including the basic cellular radio, has different current consumption profiles whereby some have relatively short high peak current demands. Most of the subsystems, however, operate in bursts wherein they consume large amounts of current for short periods of time. Examples of several subsystems that have high peak current demands include WLAN consuming over 200 mA during transmission; the handset display backlight which consumes over 200 mA when active; the cellular radio which also consumes over 200 mA when actively transmitting; the handset host (i.e. OMAP). In addition, UWB and WiMax also exhibit high peak current demand.

By default, the various subsystems are not synchronized with each other. Hence, the peak current consumptions of multiple subsystems will overlap and combine together. This causes the total peak current consumption to increase markedly for possibly long periods of time. Standard prior art handset design are only able to handle overlapping peak currents of the various subsystems that, when summed together, are less than the total peak current the battery and power supply circuit of the handset can handle. For example, the total peak current demand for a complex handset may exceed as much as 1 A.

To meet the total peak current demand of overlapping high current subsystems, larger and more expensive batteries are required along with an increase in the complexity of the design of the power module that supplies power to the entire handset.

There is thus a need for a mechanism that is capable of managing the total peak current demands of the various subsystems in the mobile handset. The mechanism should be able to regulate and limit the total peak current demand of all subsystems such that it does not exceed the current handling capabilities of the battery and power module circuits.

SUMMARY OF THE INVENTION

The present invention provides a solution to the problems of the prior art by providing a novel and useful mechanism for regulating and managing the peak current consumption of the subsystems in a mobile handset device. The mechanism of the present invention is operative to limit the current consumption at any point in time to a predetermined level that is within the current handling capability of the power management system of the handheld device.

The mechanism operates by having the high peak current subsystems advertise in advance their intention to initiate a current peak. The advertisements or requests from all interested subsystems are collected and processed. An arbitration scheme is used to determine whether a subsystem is either granted permission to initiate or is blocked from initiating a peak current.

Several embodiments of the present invention are presented. A first embodiment of a generalized mechanism for limiting the peak current of a handset is described. A second embodiment is presented that is an illustrative example of the mechanism of the present invention implemented in a handset incorporating a backlight display, cellular radio and WLAN modem wherein the backlight is kept off when either the cellular radio or WLAN are transmitting. A third embodiment is presented that is an illustrative example of the mechanism of the present invention implemented in a handset that incorporates a backlight display, cellular radio and WLAN modem wherein the backlight is kept off when either the cellular radio or WLAN are transmitting. Unlike in the second embodiment, however, the period of time the backlight is kept off is tracked. The 'on' time of the backlight in the current and/or future cycles is extended by this period of time.

The mechanism of the present invention provides several advantages. One advantage is that the arbitration mechanism effectively reduces the total current peaks for mobile handsets that incorporate multiple technologies (e.g., cellular, WiMax, WLAN, Bluetooth, etc.). The total peak current without the benefit of the invention is simply the sum of the peak current demand of each of the subsystems, i.e. $I_1+I_2+I_3+ \ldots +I_N$, where $I_N$ is the current peak for a particular technology. The use of the present invention, however, reduces the total peak current to a significantly smaller value, namely $MAX(I_1, I_2, I_3 \ldots I_N)$.

A second advantage of the mechanism of the present invention is that it relaxes the peak current requirements on the mobile handset battery. Since the total peak current is now limited, the mobile handset is subject to a typically much lower peak current requirement. Thus, the demands placed on the power management circuit including the battery are significantly lower.

A third advantage of the mechanism of the present invention is that it reduces the voltage dips that are associated with the current peaks of the subsystems. This simplifies the design of the power management module of the mobile handset.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of managing peak current consumption for use in a mobile handset incorporating a plurality of current consuming subsystems, the method comprising the steps of each subsystem advertising an intent to initiate a current peak in advance, arbitrating among all subsystems desiring to initiate a current peak so as to limit total current consumption of the handset to a predetermined value and granting permission to one or more subsystems to initiate a current peak in accordance with the arbitration results.

There is also provided in accordance with the present invention, an apparatus for managing peak current consumption in a mobile handset incorporating a plurality of current consuming subsystems, the method comprising the steps of each subsystem comprising means for requesting in advance permission to initiate a current peak, a controller operative to receive the requests from the plurality of subsystems, the controller comprising means for arbitrating among all subsystems requesting to initiate a current peak in accordance with priorities corresponding thereto so as to limit the total current consumption of the handset to a predetermined value and means for granting permission to one or more subsystems to initiate a current peak in accordance with the arbitration results.

There is further provided in accordance with the present invention, a method of managing peak current consumption in a mobile handset incorporating a display backlight, first wireless subsystem and a second wireless subsystem, the method comprising the steps of turning the backlight off when either the first wireless subsystem or the second subsystem is transmitting so as to limit total current consumption of the handset to a predetermined value and extending the normal 'on' time of the backlight by the duration the backlight is held off due to transmission by the first wireless subsystem or the second wireless subsystem.

There is also provided in accordance with the present invention, an apparatus for regulating peak current consumption in a mobile handset incorporating a display backlight, a wireless subsystem and a Wireless Local Area Network (WLAN) modem comprising control means coupled to the backlight, wireless subsystem and the WLAN modem, the control means operative to prevent the backlight from turning on when either the wireless subsystem or the WLAN modem are transmitting so as to limit total current consumption of the handset to a predetermined value.

There is further provided in accordance with the present invention, a mobile handset for use in a wireless communications network comprising a wireless modem, a Wireless Local Area Network (WLAN) modem, a display backlight whose brightness level is controlled by the duty cycle of a pulse width modulation (PWM) signal, a PWM signal generator coupled to the display backlight and operative to generate the PWM signal and means for setting the PWM signal off during transmissions of either the wireless modem or the WLAN.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AC | Alternating Current |
| ASIC | Application Specific Integrated Circuit |
| AVI | Audio Video Interleave |
| BMP | Windows Bitmap |
| CPU | Central Processing Unit |
| DC | Direct Current |
| DSP | Digital Signal Processor |
| EDGE | Enhanced Data rates for Global Evolution |
| FM | Frequency Modulation |
| FPGA | Field Programmable Gate Array |
| GPS | Ground Positioning Satellite |
| HDL | Hardware Description Language |
| IEEE | Institute of Electrical and Electronics Engineers |
| JPG | Joint Photographic Experts Group |
| LED | Light Emitting Diode |
| MP3 | MPEG-1 Audio Layer 3 |
| MPG | Moving Picture Experts Group |
| OMAP | Open Multimedia Applications Platform |
| PA | Power Amplifier |
| PC | Personal Computer |
| PDA | Portable Digital Assistant |
| PWM | Pulse Width Modulation |
| RAM | Random Access Memory |
| RF | Radio Frequency |
| ROM | Read Only Memory |
| TV | Television |
| USB | Universal Serial Bus |
| UWB | Ultra Wideband |
| WCDMA | Wideband Code Division Multiple Access |
| WiFi | Wireless Fidelity |
| WiMax | Worldwide Interoperability for Microwave Access |
| WLAN | Wireless Local Area Network |
| WMA | Windows Media Audio |
| WMV | Windows Media Video |

Detailed Description of the Invention

The present invention provides a solution to the problems of the prior art by providing a novel and useful mechanism for regulating and managing the peak current consumption of the subsystems in a mobile handset device. The mechanism of the present invention is operative to limit the current consumption at any point in time to a predetermined level that is within the current handling capability of the power management system of the handheld device.

The mechanism operates by having the high peak current subsystems advertise in advance their intention to initiate a current peak. An arbitration mechanism considers the advertisements or requests sent from interested subsystems and determines whether a subsystem is either granted permission to initiate or is blocked from initiating a peak current session.

Several embodiments of the present invention are presented. A first embodiment of a generalized mechanism for limiting the peak current of a handset is described. A second embodiment is presented that is an illustrative example of the mechanism of the present invention implemented in a handset incorporating a backlight display, cellular radio and WLAN modem wherein the backlight is kept off when either the cellular radio or WLAN are transmitting. A third embodiment is presented that is an illustrative example of the mechanism of the present invention implemented in a handset that incorporates a backlight display, cellular radio and WLAN modem wherein the backlight is kept off when either the cellular radio or WLAN are transmitting. Unlike in the second embodiment, however, the period of time the backlight is kept off is tracked. The 'on' time of the backlight in the current and/or future cycles is extended by this period of time.

To aid in understanding the principles of the present invention, the description of the peak current management mechanism is provided, in some embodiments, in the context of a mobile handset, and in particular a cellular phone. It is also appreciated by one skilled in the art, however, that the peak current management mechanism of the present invention is not limited for use with a mobile handset only, but may be easily adapted for use with non-mobile communication devices as well, such as PDAs, Multimedia players (MP3, MP4) etc.

It is also appreciated by one skilled in the art, however, that the peak current management mechanism of the present invention is not limited for use with any particular communication standard (wireless or otherwise) and can be adapted for use with numerous wireless (or wired) communications standards such as EDGE, extended data rate Bluetooth, WCDMA, Wireless LAN (WLAN), Ultra Wideband (UWB), coaxial cable, radar, optical, etc. Further, the invention is not limited for use with a specific PHY or radio type but is applicable to other compatible technologies as well.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMax, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term mobile handset is defined as any apparatus including a communications transceiver or device that is capable of communicating in a non-fixed portable environment, e.g., mobile or cellular phone).

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Mobile Handset

Figure 2:
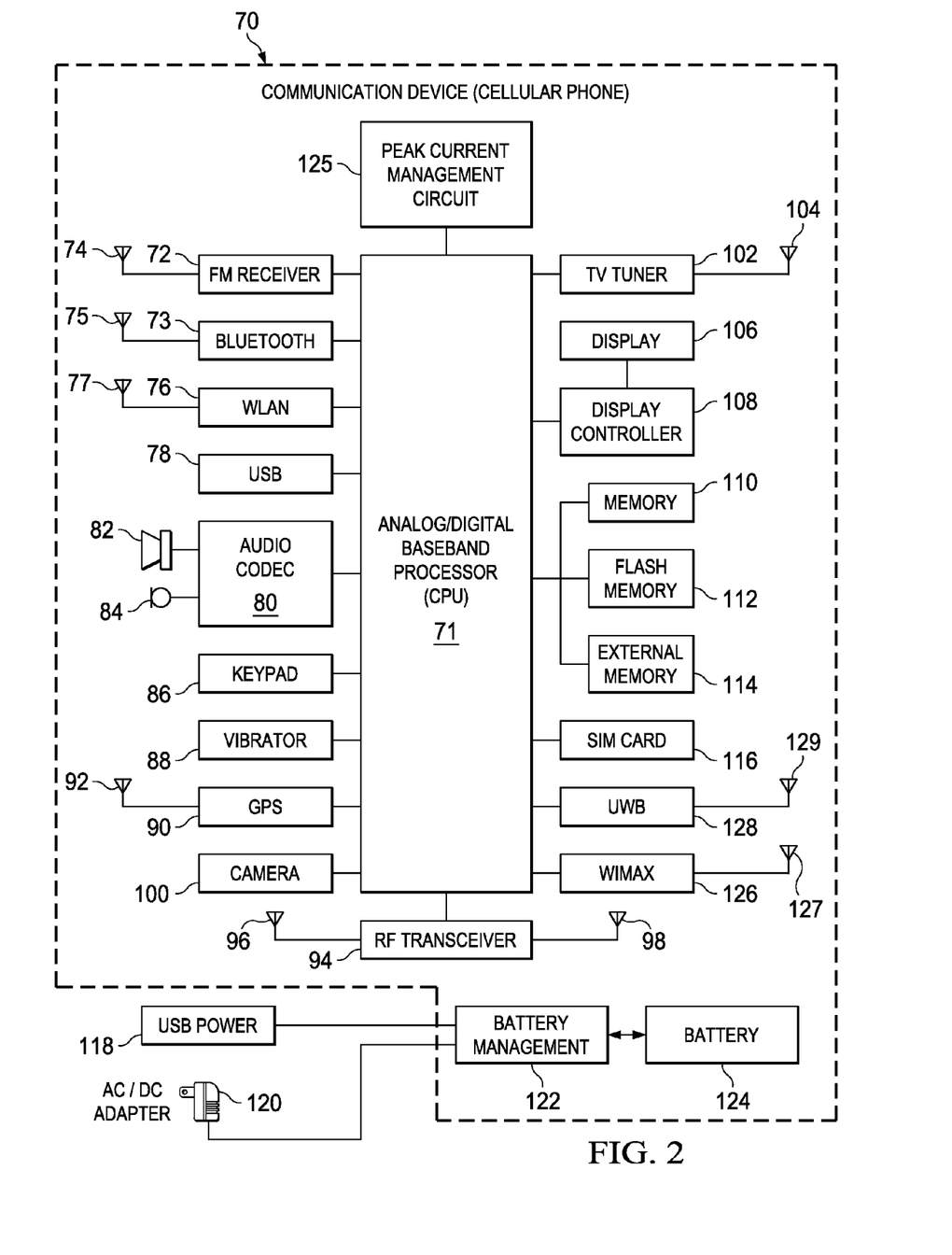
FIG. 2 is a block diagram illustrating an example mobile handset incorporating the peak current consumption management mechanism of the present invention.

A block diagram illustrating an example mobile handset incorporating the peak current consumption management mechanism of the present invention is shown in FIG. 2. The mobile handset may comprise any suitable device such as multimedia player, mobile device, cellular phone, PDA, Bluetooth device, GPS device, etc. For illustration purposes only, the mobile handset is shown as a cellular phone having several additional subsystems incorporated in the handset. Note that this example is not intended to limit the scope of the invention as the automatic link establishment mechanism of the present invention can be implemented in a wide variety of communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cellular phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, a camera and related circuitry 100, a TV tuner 102 and associated antenna 104, display 106 and associated display controller 108 and GPS receiver and associated antenna 92.

A USB interface connection 78 provides a serial link to a user's PC or other device. An FM transceiver 72 (i.e. FM transmitter and FM receiver) and antenna 74 provide the user the ability to listen to FM broadcasts. WLAN interface 76 and antenna 77 provide wireless connectivity when in a hot spot or within the range of an ad hoc, infrastructure or mesh based wireless network. WiMax interface 126 and associated antenna 127 provide wireless connectivity to WiMax networks. UWB interface 128 and associated antenna 129 provide wireless connectivity when within the range of a UWB wireless network. Bluetooth interface 73 and antenna 75 provide Bluetooth wireless connectivity when within the range of a Bluetooth wireless network. SIM card 116 provides the interface to a user's SIM card for storing user data such as address book entries, etc.

A peak current management circuit 125 is coupled to the baseband processor and operative to implement the peak current regulation mechanism of the present invention. In an alternative embodiment of the invention, the peak current regulation mechanism is implemented in software as one or more processes or tasks adapted to reside in memory and execute on the baseband processor 71 or other computing platform or device.

Portable power is provided by the battery 124 coupled to battery management circuitry 122. External power is provided via USB power 118 or an AC/DC adapter 120 connected to the battery management circuitry which is operative to manage the charging and discharging of the battery 124.

First Embodiment

Generalized Communication Device

Figure 3:
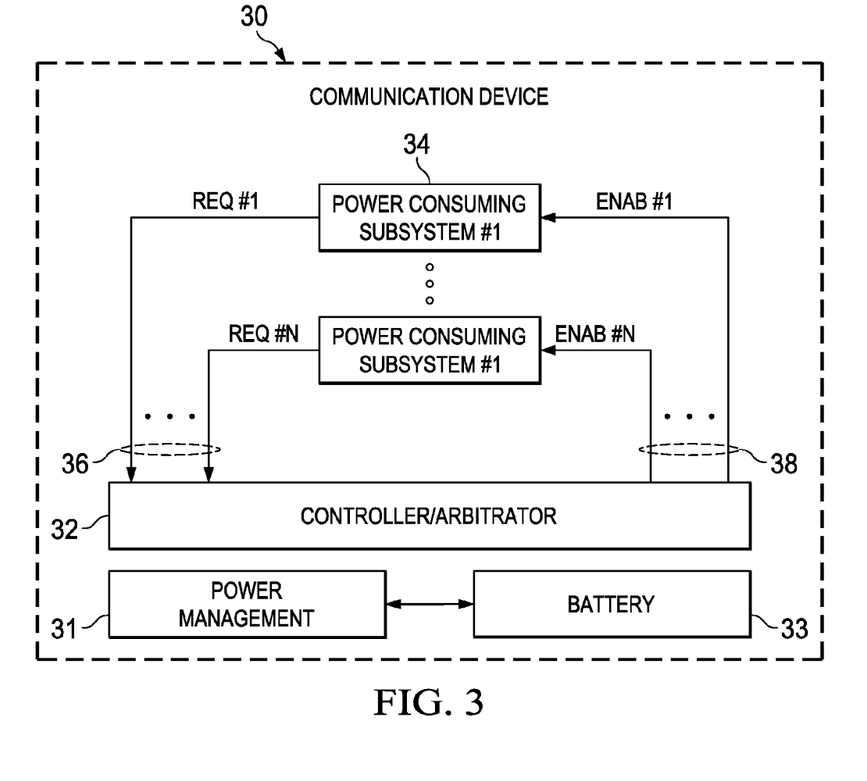
FIG. 3 is a block diagram illustrating a first embodiment of the peak current consumption management mechanism of the present invention.

A block diagram illustrating a first embodiment of the peak current consumption management mechanism of the present invention is shown in FIG. 3. The communication device, generally referenced 30, comprises a plurality of peak power consuming subsystems 34, labeled power consuming subsystem #1 through #N, a controller/arbitrator 32, power management module 31 and battery 33. The communication device may comprise a mobile handset, non-mobile device or any other device that incorporates a plurality of current consuming subsystems whose peak current demands would otherwise overlap and possibly exceed the peak current handling capacity of the power management module.

In accordance with the mechanism of the present invention, the power consuming subsystems advertise their intent to initiate a current peak in advance. A subsystem advertises its intent by asserting its respective request (REQ) line 36. The N request lines are input to the controller/arbitrator which is operative to arbitrate between the one or more requests. The arbitration scheme takes several factors into account in determining whether to either grant or deny permission to a subsystem to initiate a current peak. The factors include (1) the priority (if any) assigned to each of the subsystems; and (2) the limitations of the technologies implemented by each of the subsystems. Note that not all the subsystems may have limitations associated with them. Once a decision is made to permit one or more subsystems to initiate a current peak, the subsystem(s) are notified via the appropriate enable (ENAB) line(s) 38.

For some subsystems, the blocking of the current peak is not permitted while other subsystems may be able to tolerate current peak blocking and would simply reschedule the current peak to a different time. For example consider cellular modem voice transmission as a subsystem that could not tolerate current peak blocking. On the other hand, consider WLAN transmissions wherein the WLAN subsystem could tolerate current peak blocking.

To aid in understanding the principles of the present invention, two illustrative example embodiments are presented. Both examples are communication systems (e.g., mobile handsets) that comprise a cellular radio subsystem, WLAN subsystem and a display backlight subsystem. The systems may be implemented in any cellular or WiMax based mobile handset or any other communication device. Note that the peak current demands of both cellular and WiMax radios are similar (with both requiring approximately 200 mA on transmission) and thus can be interchanged in this illustrative example. Therefore references to the cellular radio or modem are intended to refer to a WiMax radio subsystem as well.

In both embodiments, the cellular radio transmissions are signaled to the WLAN subsystem. In response, the WLAN subsystem is operative to block itself from transmitting during the times the cellular modem is transmitting. In an alternative embodiment, for periodic cellular voice transmissions, the WLAN learns the transmission pattern of the cellular modem and is operative to schedule it's transmissions around the transmissions of the cellular modem. Further, access point (AP) transmissions can also be scheduled to ensure they do not overlap with cellular modem transmission slots by the use of CTS packets.

The display backlight source in handheld devices is typically operated through a driver circuit that uses pulse width modulation (PWM) to control the brightness or intensity of the backlight source (typically an LED). The perceived brightness of the display is controlled by the duty cycle of the PWM control signal. The LED is periodically switched on and off in accordance with the duty cycle of the PWM signal.

Thus, in accordance with the invention, two schemes for limiting the current consumption of the display backlight when operating in conjunction with the WLAN and cellular radio subsystems is presented. In the first control scheme, the PWM signal is input to the WLAN subsystem which effectively controls its transmission to the display backlight. In the second control scheme, the PWM signal is controlled as well but the 'on' time of the PWM signal is rescheduled and not simply blocked. The first control scheme is described below followed by a description of the second control scheme.

Second Embodiment

Mobile Handset without Rescheduling

Figure 4:
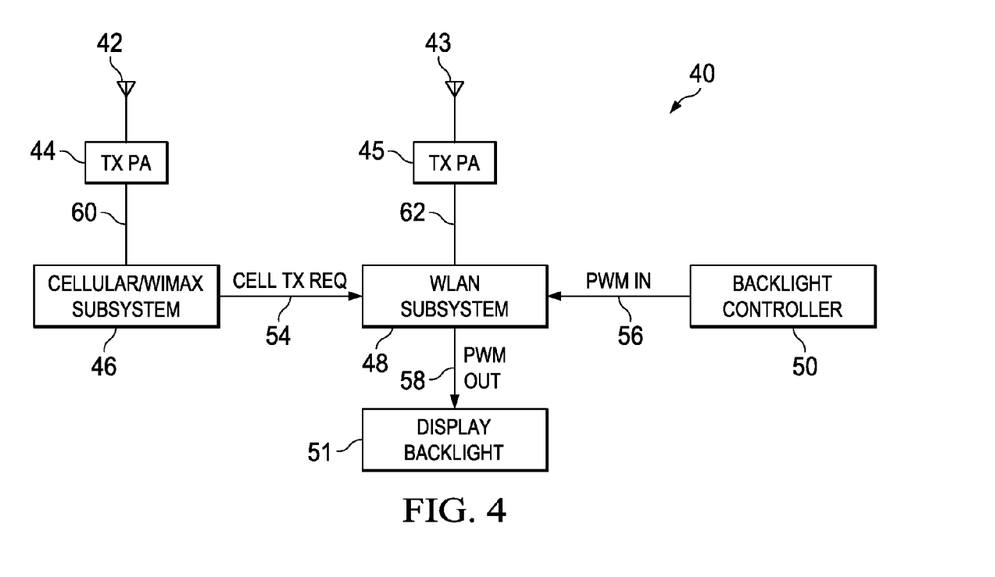
FIG. 4 is a block diagram illustrating a second embodiment of the peak current consumption management mechanism of the present invention.

A block diagram illustrating a second embodiment of the peak current consumption management mechanism of the present invention is shown in FIG. 4. This second embodiment implements the first control scheme described supra. It is a specific implementation example of the general arbitration scheme of FIG. 3 for a mobile handset comprising a WLAN, cellular and display backlight subsystems. The system, generally referenced 40, comprises a cellular/WiMax subsystem 46, WLAN subsystem 48, display backlight 51, backlight controller 50, cellular TX power amplifier (PA) 44, WLAN TX power amplifier 45 and antennas 42, 43.

In operation, cellular modem (i.e. radio) transmissions are signaled to the WLAN subsystem via the CELL_TX_REQ signal line 54. When a notification is received by the WLAN subsystem that the cellular radio intends to transmit, the WLAN subsystem is operative to block itself from transmitting during transmissions of the cellular radio. Cellular radio TX signal 60 is input to the TX power amplifier 44 for transmission over the antenna 42. Similarly, WLAN subsystem TX signal 62 is input to the TX power amplifier 45 for transmission over antenna 43.

The PWM IN signal 56 from the backlight display is input to the WLAN subsystem which effectively controls the signal to generate the PWM OUT signal 58. When the WLAN subsystem intends to transmit, it generates a WLAN TX REQ signal (not shown) internal to the subsystem. The WLAN subsystem transmits only if the cellular radio is not intending to transmit as indicated by the CELL_TX_REQ signal.

Figure 5:
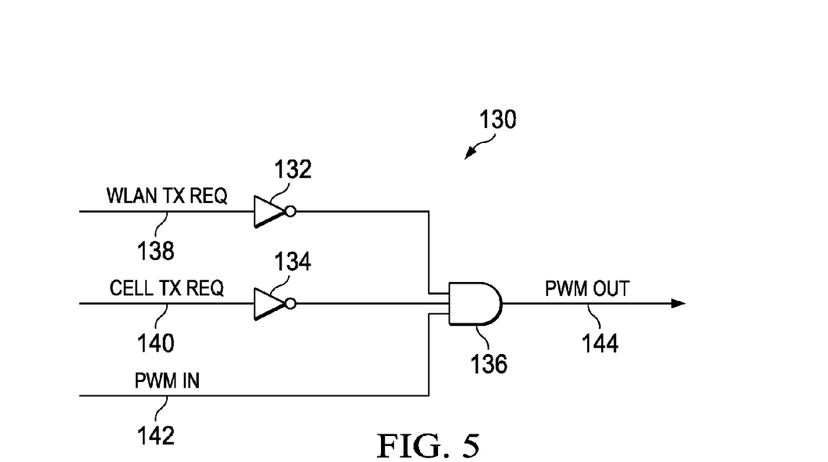
FIG. 5 is a diagram illustrating the logic function performed by the WLAN subsystem of FIG. 4.

The WLAN subsystem implemented a simple AND operation wherein the transmit request signals from the WLAN subsystem and the cellular radio are gated with the PWM input signal to generate the PWM OUT signal 58. This is illustrated in FIG. 5 wherein circuit 130 comprises inverters 132, 134 and AND gate 136. In operation, the WLAN TX REQ 138 and CELL TX REQ 140 signals are inverted by inverters 132, 134, respectively, before being input to AND gate 136. The PWM IN signal 142 is the third input signal which is gated against the two inverted TX request signal. Thus, only when the cellular radio and the WLAN subsystem are not transmitting, is the display backlight PWM control signal enabled.

Figure 6:
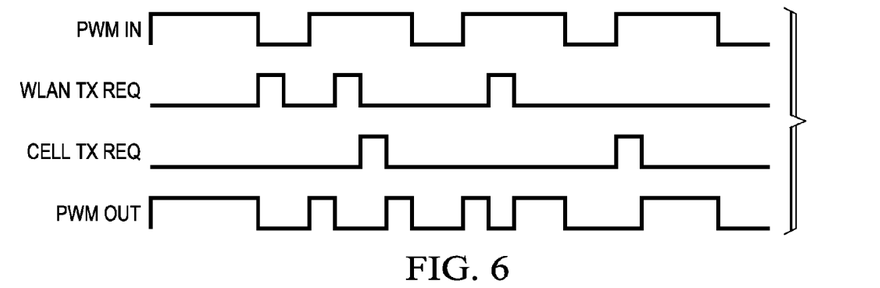
FIG. 6 is a logic timing diagram illustrating the operation of the logic function of FIG. 5.

It is noted that for this scheme to perform adequately, it is preferable that the PWM frequency be relatively low and have a limited duty cycle. For example, the setting of the frequency and duty cycle should be such that a period of at least 2.5 msec of PWM 'off' time exists in every PWM cycle. For a PWM frequency of 100 Hz, for example, this would limit the PWM duty to 75%. A logic timing diagram illustrating the operation of the logic function of FIG. 5 is shown in FIG. 6.

Third Embodiment

Mobile Handset with Rescheduling

Figure 7:
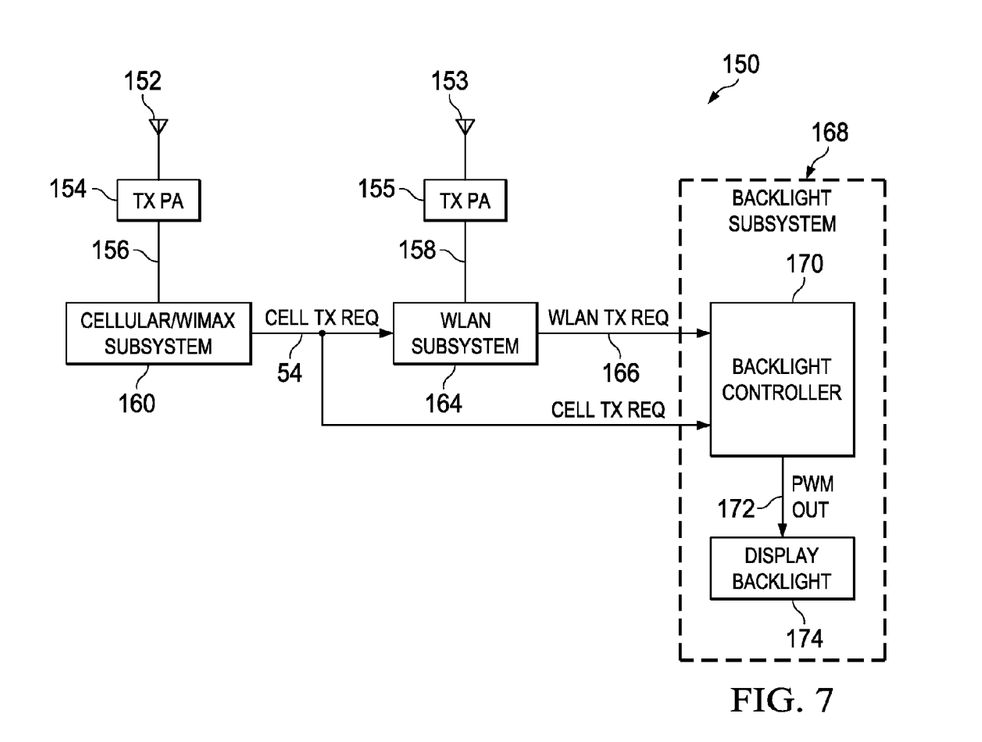
FIG. 7 is a block diagram illustrating a third embodiment of the peak current consumption management mechanism of the present invention.

A block diagram illustrating a third embodiment of the peak current consumption management mechanism of the present invention is shown in FIG. 7. This third embodiment implements the second control scheme described supra. It is another specific implementation example of the general arbitration scheme of FIG. 3 for a mobile handset comprising a WLAN, cellular and display backlight subsystems. The system, generally referenced 150, comprises a cellular/WiMax radio subsystem 160, WLAN subsystem 164, backlight subsystem 168, cellular TX power amplifier (PA) 154, WLAN TX power amplifier 155 and antennas 152, 153. The backlight subsystem 168 comprises display backlight 174 and backlight controller 170.

In operation, cellular modem (i.e. radio) transmissions are signaled to the WLAN subsystem via the CELL TX REQ signal line 162. When a notification is received by the WLAN subsystem that the cellular radio intends to transmit, the WLAN subsystem is operative to block itself from transmitting during transmissions of the cellular radio. Cellular radio TX signal 156 is input to the TX power amplifier 154 for transmission over antenna 152. Similarly, WLAN subsystem TX signal 158 is input to the TX power amplifier 155 for transmission over antenna 153.

Cellular modem (i.e. radio) transmissions are signaled to the backlight subsystem via the CELL TX REQ signal 162. In addition, WLAN transmissions are also signaled to the backlight subsystem via the WLAN TX REQ signal 166. The backlight controller 170 is adapted to receive both cellular and WLAN TX request signals and to generate the PWM OUT signal 172 that is used to control the brightness level of the display backlight 174.

This third embodiment is based on the rescheduling of the PWM signal 'on' time. The backlight is held in the 'off' state during cellular and WLAN transmissions. Rather then utilize an AND logic function, the system 150 is operative to track the time the backlight was held off and to reschedule the 'on' time to periods when the cellular and WLAN radios are not transmitting.

In operation, the backlight controller is operative to turn the PWM output signal off during the periods that the either the cellular or WLAN radios are transmitting. The 'off' time that was originally intended for the current PWM cycle is subsequently reduced by the period of time the PWM signal was held in the 'off' state. Thus, the PWM signal is only in the 'off' state for this residue of time while the remainder of the time it is in the 'on' state.

Figure 8:
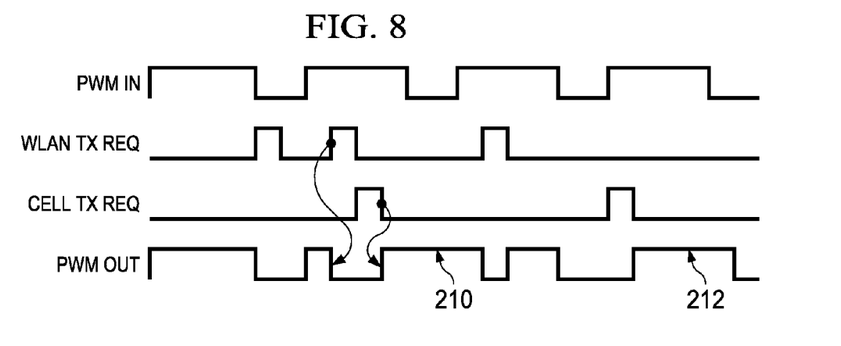
FIG. 8 is a diagram illustrating the logic function performed by the backlight controller of FIG. 7.

It is noted that for this scheme to perform adequately, it is preferable that the PWM frequency be relatively low (e.g., less than 200 Hz), the transmit bursts of the cellular transmitter and WLAN transmitter be kept short (e.g., less than 5 msec) and their duty cycle be relatively low. A diagram illustrating the logic function performed by the backlight controller of FIG. 7 is shown in FIG. 8. In this example timing diagram, the PWM OUT signal 'on' time is extended (reference numeral 210) a first time due to the WLAN TX REQ and CELL TX REQ signals causing it to go to the 'off' state just prior. The PWM OUT signal 'on' time is extended a second time (reference numeral 212) due to the CELL TX REQ signal causing it to go off for a short time just prior.

Figure 9:
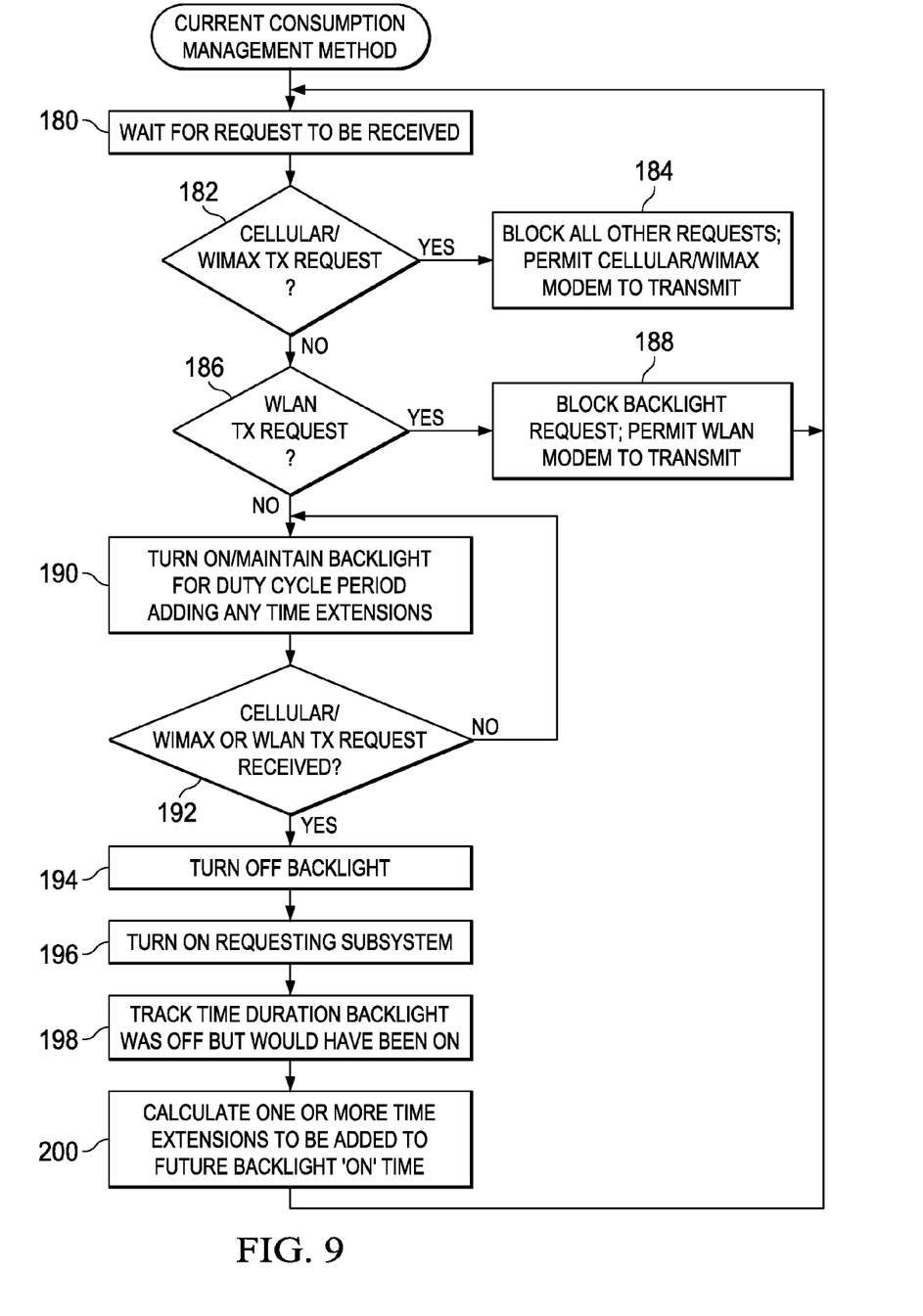
FIG. 9 is a flow diagram illustrating the peak current consumption management method of the present invention.

A flow diagram illustrating the peak current consumption management method of the present invention is shown in FIG. 9. This method implements the second control scheme whereby the time the PWM signal is held off is tracked and used to reduce subsequent off times accordingly so as to maintain a constant brightness level to the handheld user. In the case of the third embodiment, the method is implemented by the backlight controller but can, alternatively, be implemented by any other circuit block depending on the particular implementation.

Initially, the controller waits for a transmit request to be received (step 180). If a cellular or WiMax transmit request is received (step 182), the controller blocks all other peak current initiate requests and enables the cellular/WiMax modem to transmit (step 184) and method returns to step 180. If no cellular or WiMax transmit request is received (step 182), it is checked whether a WLAN transmit request is received (step 186). If a request is received, the backlight request is blocked (i.e. PWM signal is held 'off') and the WLAN modem subsystem is permitted to transmit (step 188).

If the a WLAN transmit request is not received (step 186) and the display backlight is to be turned on (i.e. PWM IN signal in the 'on' state, then the display backlight is turned on (i.e. PWM OUT enabled in 'on' state) for the duty cycle period wherein any time extensions previously tracked are added to the 'on' time (step 190). If during the PWM 'on' time, a cellular/WiMax or WLAN transmit request is received (step 192), the display backlight is immediately turned off (step 194) and the particular requesting subsystem is enabled to transmit (step 196).

In accordance with the invention, the time duration the PWM signal is held in the off state but would have otherwise been on, is tracked and stored (step 198). One or more time extensions to be added to future backlight 'on' time cycles are calculated (more than one if the time is greater than the normal 'off' time of the PWM signal) (step 200). The method then continues with step 180. As long as there are no cellular/WiMax or WLAN transmit requests, the time extensions are added to the PWM on time in step 190. In this manner, the current consumption of the mobile handset is limited by regulating the peak current consumption of the high peak current subsystems. It is appreciated by one skilled in the electrical arts that the current regulating principles of the present invention can be applied to communication devices having combinations of subsystems different than that of the examples presented herein without departing from the spirit and scope of the present invention.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of managing peak current consumption in a mobile handset incorporating a display backlight, first wireless subsystem and a second wireless subsystem, said method comprising the steps of:
   turning said backlight off when either said first wireless subsystem or said second subsystem is transmitting so as to limit total current consumption of said handset to a predetermined value; and
   extending the normal 'on' time of said backlight by the duration said backlight is held off due to transmission by said first wireless subsystem or said second wireless subsystem.

2. The method according to claim 1, wherein said first wireless subsystem comprises a cellular modem.

3. The method according to claim 1, further comprising the step of preventing said second wireless subsystem from transmitting during transmission by said cellular modem.

4. The method according to claim 1, wherein said first wireless subsystem comprises a WiMax modem.

5. The method according to claim 1, further comprising the step of preventing said second wireless subsystem from transmitting during transmission by said WiMax modem.

6. The method according to claim 1, wherein said second wireless subsystem comprises a Wireless Local Area Network (WLAN) modem.

7. The method according to claim 1, wherein the normal 'on' time of said backlight is extended so as to maintain an originally intended brightness level of said backlight.

8. An apparatus for regulating peak current consumption in a mobile handset incorporating a display backlight, a wireless subsystem and a Wireless Local Area Network (WLAN) modem, comprising:
control means coupled to said backlight, said wireless subsystem and said WLAN modem, said control means operative to prevent said backlight from turning on when said wireless subsystem is transmitting and when said WLAN modem is transmitting so as to limit total current consumption of said mobile handset to a predetermined value.

9. The apparatus according to claim 8, wherein said wireless subsystem comprises a cellular modem.

10. The apparatus according to claim 8, wherein said wireless subsystem comprises a WiMax modem.

11. The apparatus according to claim 8, wherein said control means further comprises means for extending the normal 'on' time of said backlight by the duration said backlight is held off due to transmission by either said wireless subsystem or said WLAN modem.

12. A mobile handset for use in a wireless communications network, comprising:
a wireless subsystem;
a Wireless Local Area Network (WLAN) modem;
a display backlight whose brightness level is controlled by the duty cycle of a pulse width modulation (PWM) signal;
a PWM signal generator coupled to said display backlight and operative to generate said PWM signal; and
means for setting said PWM signal off during transmissions of either said wireless subsystem or said WLAN modem.

13. The mobile handset according to claim 12, wherein said wireless subsystem comprises a cellular modem.

14. The mobile handset according to claim 12, wherein said wireless subsystem comprises a WiMax modem.

15. The mobile handset according to claim 12, further comprising means for shortening the current PWM 'off' cycle by the duration said PWM signal was held off due to transmission by either said wireless subsystem or said WLAN modem.

16. The mobile handset according to claim 12, further comprising means for preventing said WLAN modem from transmitting during transmission by said wireless subsystem.

* * * * *